United States Patent Office 3,450,519
Patented June 17, 1969

3,450,519
DESICCATION OF GRASS
Jerry H. Stoller, Savannah, Ga., assignor, by mesne assignments, to Kaiser Aluminum & Chemical Corporation, Oakland, Calif., a corporation of Delaware
No Drawing. Filed Oct. 13, 1965, Ser. No. 495,731
Int. Cl. A01n 5/00
U.S. Cl. 71—69                                5 Claims

ABSTRACT OF THE DISCLOSURE

A process for desiccating growing green feeding grass for animals is disclosed. The grass is contacted with ammonia vapor and desiccated in the atmosphere by the evaporation of the ammonia before the grass is cut. Such desiccation greatly reduces the moisture removal load in a subsequent treatment in a dehydrator.

---

This invention relates to a novel method for the desiccation of grass and, more particularly, to a novel method for the desiccation of green grass to prepare the same for subsequent processing, such as baling and pelleting.

It frequently happens that the feeding grass for animals, such as horses and cattle, is grown in one part of the country and shipped to another. In shipping the grass or hay it is advantageous to dry the grass and then bale or pellet the same prior to shipment.

The present methods for dehydrating the grass, before the pelleting operation, are mainly of two types: drying the green grass in a dehydrator as soon as the grass is cut or allowing the cut grass to wilt in the sun to partially dry it before feeding into the dehydrator. If the grass is wilted in the atmosphere first, the capacity of a given dehydrator can be doubled because of the lower amount of moisture which must be removed therein. However, the grass may pick up moisture, instead of being dried, when exposed to the atmosphere. This can happen, for example, by way of condensing dew and rainfall. In addition, to wilt the grass, additional space and labor for handling would be required. The grass which is cut and subjected to rainfall will lose nutritional value.

It is, accordingly, an object of the present invention to provide a novel process for the desiccation of green grass.

It is another object of the present invention to provide a novel process for the desiccation of grass which is both economical and fast.

A further object of the invention is to provide a process for drying green grass without causing injury to the same.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description. Unless otherwise provided, all percentages are by weight.

In accordance with the present invention, the above objects are accomplished by treating growing green grass with ammonia vapor and allowing the treated grass to stand in the atmosphere for a short period of time after contact with the ammonia vapor. Thereafter, the treated grass is cut from the ground for further processing.

In carrying out the process of my invention, any suitable method for contacting the green grass with ammonia vapor can be used. It has been found economical and convenient to transport the ammonia out to the grass fields by means of a tank truck. When the truck arrives at its destination, control means on the truck may be opened to allow ammonia vapor to float across the field of grass to be treated. In general, I found that the floating vapor can effectively cover approximately 8,000 square feet of area. This area can be increased by the use of a hose, for example, to direct the vapor to points further away from the truck. After one area is so treated, the truck or the ammonia container may be moved to another area for further treatment. Alternatively, a modified anhydrous ammonia applicator containing numerous spray nozzles may be attached to a tractor. By releasing a continuous flow of ammonia vapor behind the moving tractor, the desiccating operation can continue uninterrupted until an entire field is treated. A canvas or other suitable cover can be dragged behind the unit so that a few seconds would be provided for the ammonia vapor to settle into the grass tissue.

After contacting the green grass with ammonia vapor, the grass is allowed to stand in the field for a short period of time, e.g. 2 to 3 hours before it is cut. This is the desiccating period during which the moisture content of the green grass is greatly reduced.

In a specific example, a nurse tank having a 1,000 gallon liquid capacity was driven onto a field of grass ready to be harvested. A valve on the tank was opened and ammonia vapor was allowed to float across approximately 8,000 square feet of grassed area. The following table summarizes the results of this experiment:

TABLE

| Sample No. | Waiting period, before cutting (hrs.) | Green weight (oz.) | Dry weight (oz.) | Moisture (oz.) | Percent moisture based on green wt. of sample | Percent moisture based on dry wt. of sample | Percent moisture which must be removed to obtain 25% moisture hay | Percent moisture which must be removed to obtain 10% moisture hay |
|---|---|---|---|---|---|---|---|---|
| 1 | (¹) | 70 | 22 | 48 | 68.6 | 218 | 193 | 208 |
| 2 | 0 | 55 | 17 | 38 | 69.1 | 223.5 | 198.5 | 213.5 |
| 3 | 0.5 | 76 | 29 | 47 | 61.8 | 162 | 137 | 152 |
| 4 | 1 | 74 | 30 | 44 | 59.0 | 146.5 | 121.5 | 136.5 |
| 5 | 2 | 62 | 29 | 33 | 53.2 | 114 | 89 | 104 |
| 6 | 3 | 54 | 25 | 29 | 53.7 | 116 | 91 | 106 |
| 7 | 4 | 67 | 32 | 35 | 52.2 | 109.5 | 84.5 | 99.5 |
| 8 | 5 | 70 | 32 | 38 | 54.3 | 118.5 | 93.5 | 108.5 |
| 9 | 6 | 84 | 42 | 42 | 50.0 | 100 | 75 | 90 |
| 10 | 0.75 | 77 | 31 | 46 | 59.8 | 148.5 | 123.5 | 138.5 |
| 11 | 6 | 62 | 33 | 29 | 46.7 | 88 | 63 | 78 |

¹ Green sample.

In the above table, sample No. 1 represents green grass cut from the field immediately before the field was treated with ammonia vapor. Sample No. 2 represents green grass which was cut immediately after the treatment. Thereafter, samples of the treated grass were cut at regular intervals as indicated in the second column. Samples Nos. 10 and 11 represent grass subjected to the greatest concentration of ammonia vapor, i.e. grass located nearest to the ammonia outlet valve. The green weight of the samples represents the weight of the samples immediately after the cutting.

The green samples were exposed to the atmosphere and allowed to be air dried. It was noted that the ammonia treated grass dried in about 2 hrs. while the untreated grass took about 6 hrs. to dry. The weights of the air dried sample are recorded in the fourth column of the table.

Generally, the hay to be baled or pelleted contains between about 10% to about 25% moisture by weight. Therefore, the amounts of moisture which must be removed from the cut green samples to obtain a 25% moisture hay and to obtain a 10% moisture hay are tabulated in the last two columns of the above table. From these two columns it can be seen that the amount of moisture which must be removed from the green grass decreases sharply if the green grass is first treated with ammonia vapor and then allowed to stand in the atmosphere for a short period of time before cutting. Thus, when the green grass is first treated with ammonia vapor and then allowed to stand for two hours before cutting from the ground, sample No. 5, the amount of moisture which must be subsequently removed has reduced to about one-half of the amount which must be removed from the untreated sample (sample No. 1). Although additional desiccation was effected when the treated grass was allowed to stand for much longer periods of time, i.e. up to 6 hours, it appears that the greatest desiccating activity took place within the first two hours from the time of the treatment.

The amount of ammonia to be used per unit of area of live grass can be varied within wide limits. Although very small amounts of ammonia, i.e., 2 to 5 lbs. of ammonia per acre, can be used to obtain some desiccation, the desiccating effect is small when ammonia is used at this rate. The use of extremely large amounts of ammonia, i.e., 50 to 100 lbs. of ammonia per acre, is uneconomical and not necessary. In general, it has been found that about 20 to 30 lbs. of 82% anhydrous ammonia per acre of grass is very effective and economically attractive. The cost of this treatment compares very favorably with alternative methods, i.e. drying the untreated green grass in a dehydrator or gas heater. Ammonia is a volatile and effervescent material. Hence, the treated grass is found to contain very little of the ammonia applied thereto. There appears to be about 3 to 4 lbs. of ammonia retained in the grass harvested from an acre of standing grass treated in accordance with the process of this invention. The amount of retained ammonia will vary with the age and the moisture content of the grass, etc. The retained ammonia adds to the crude protein content of the grass for the purposes of animal feed. Moreover, ammonia, in the form of ammonium hydroxide solutions, is conventionally sprayed onto plant materials immediately after cutting to minimize deterioration of the vitamin and carotin content (see U.S. Patent 2,579,609 to Peebles et al.). Thus, the small amount of residual ammonia will increase the feeding quality and the keeping quality of the grass.

It will be recognized that various modifications may be made in the invention as described above.

What is claimed is:

1. A process for desiccating feeding grass for animals comprising contacting growing green grass with an effective amount of ammonia vapor and allowing the ammonia treated grass to be desiccated in the atmosphere before cutting the same from the ground.

2. A process according to claim 1 wherein said grass is treated with about 20 pounds of ammonia per acre of growing grass.

3. A process according to claim 1 wherein said treated grass is allowed to desiccate in the atmosphere for a period of about two hours after said treatment.

4. A process according to claim 1 wherein said treated grass is allowed to desiccate in the atmosphere for a period of about two to three hours after said treatment.

5. A process as claimed in claim 1 wherein said grass is treated with about 20 to 30 pounds of 82% anhydrous ammonia per acre of growing grass.

References Cited

UNITED STATES PATENTS

| | | | |
|---|---|---|---|
| 3,238,667 | 3/1966 | Remmert | 47—1.7 |
| 3,238,670 | 3/1966 | Mahl et al. | 47—1.7 |
| 3,331,675 | 7/1967 | Veltman | 71—65 |

JAMES O. THOMAS, JR., *Primary Examiner.*